(12) United States Patent
Ji et al.

(10) Patent No.: US 8,160,053 B2
(45) Date of Patent: Apr. 17, 2012

(54) METHOD, APPARATUS AND NETWORK ELEMENT FOR CLOCK TRACING

(75) Inventors: Kuiwen Ji, Shenzhen (CN); Junjie Feng, Shenzhen (CN); Min Zhao, Shenzhen (CN); Xinghua Shi, Shenzhen (CN); Xuan Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 12/547,016

(22) Filed: Aug. 25, 2009

(65) Prior Publication Data

US 2010/0020787 A1    Jan. 28, 2010

Related U.S. Application Data

(63) Continuation of application No. PCT/CN2008/070180, filed on Jan. 24, 2008.

(30) Foreign Application Priority Data

Apr. 11, 2007    (CN) .......................... 2007 1 0073874

(51) Int. Cl.
*H04J 3/06* (2006.01)
(52) U.S. Cl. ........................................ 370/350; 398/135
(58) Field of Classification Search .................. 370/350, 370/395.51; 398/135, 182, 202
See application file for complete search history.

(56) References Cited

U.S. PATENT DOCUMENTS

| | | | | |
|---|---|---|---|---|
| 6,226,270 B1 * | 5/2001 | Chiku et al. | ................. | 370/248 |
| 2006/0034268 A1 * | 2/2006 | Kim et al. | ..................... | 370/389 |

FOREIGN PATENT DOCUMENTS

| | | |
|---|---|---|
| CN | 1352500 A | 6/2002 |
| CN | 1617509 A | 5/2005 |
| CN | 1700623 A | 11/2005 |
| CN | 1770701 A | 5/2006 |
| EP | 1 811 713 | 7/2007 |
| EP | 1811713 A1 * | 7/2007 |
| WO | WO 95/18498 | 7/1995 |
| WO | WO 98/15077 | 4/1998 |
| WO | WO 98/35466 | 8/1998 |
| WO | WO 02/39630 | 5/2002 |

OTHER PUBLICATIONS

Liu, S. et al, "A Practical Overview of Synchronization Status Messaging and its Applicability to Sonet Networks," IEEE 1995.

(Continued)

*Primary Examiner* — Jung Park
(74) *Attorney, Agent, or Firm* — Finnegan, Henderson, Farabow, Garrett & Dunner LLP

(57) ABSTRACT

A clock tracing method includes: determining a shortest path to each source network element, and selecting a best source network element among all the source network elements; determining a shortest path to the best source network element according to the shortest path, using the shortest path to the best source network element as a clock tracing path if the shortest path to the best source network element is different from an old clock tracing path and a traceable message is received, and using the clock tracing path for tracing clocks; and using the old clock tracing path for tracing clocks if the shortest path to the best source network element is the same as the old clock tracing path or no traceable message is received. A clock tracing apparatus and a network element are also provided. The provided clock tracing method, apparatus and network element may ensure high-quality clock transmission, and the fast performance of automatic clock tracing.

1 Claim, 7 Drawing Sheets

OTHER PUBLICATIONS

Underwood, E. et al, "SONET Ring with Synchronization Status Messages—Restoration Behavior," XP-002261955 T1X1.3 Working Group Standards Project, Mar. 11, 1997.

Underwood, E. et al, "Keeping SONET/SDH in Sync Through Critical Synchronization Status Messages," XP-000783800 SONET/SDH Netsync SSM Article, Dec. 1997.

European Patent Office Communication pursuant to Article 94(3) EPC, European search opinion for Application No. 08706557.9, mailed Feb. 24, 2011, Huawei Technologies Co., Ltd.

International Search Report from P.R. China in International Application No. PCT/CN2008/070180 mailed May 8, 2008.

PCT International Preliminary Report on Patentability which includes an English Translation of Written Opinion of the International Searching Authority for PCT Application No. PCT/CN2008/070180, mailed May 8, 2008, 4 pgs.

European Patent Office Communication in Application No. 08706557.9, which encloses an extended European search report which includes, pursuant to Rule 62 EPC, the supplementary European search report (Art. 153(7)) EPC) and the European search opinion, dated Dec. 28, 2009, 9 pgs.

\* cited by examiner

METHOD, APPARATUS AND NETWORK ELEMENT FOR CLOCK TRACING

This application claims is a continuation of International Application No. PCT/CN2008/070180, filed on Jan. 24, 2008, which claims priority to Chinese Patent Application No. 200710073874.X, filed with the Chinese Patent Office on Apr. 11, 2007 and entitled "Method, Apparatus and Network Element for Clock Tracing". The contents of these applications are hereby incorporated herein by reference in their entirety.

TECHNICAL FIELD

The present disclosure relates to network synchronization technologies, and in particular, to a method, apparatus, and network element for clock tracing.

BACKGROUND

In a communication network, the clock is vital to the quality of network services. If the clock of a network is abnormal, service data pointer justification occurs, or even worse, the whole network breaks down.

Generally, the network uses one or more external clock sources to provide a clock reference for each node. Each network node traces an external clock source according to the tracing relation planned in a specific way, and switches the tracing relation when the network status changes. The clock tracing relation needs to fulfill one important principle: the clock tracing relation cannot be looped anytime. If the tracing relation is looped, for example, node A traces B, and B traces A, the network service deteriorates and fails shortly thereafter.

The traditional transport network performs clock tracing through the Synchronization Status Message (SSM) protocol. The SSM is adapted to transmit the quality level of timing signals in a synchronization timing link. Therefore, the node in the Synchronous Digital Hierarchy (SDH) network and the synchronized network obtains the information about the upstream clock by reading the SSM, operates the clock of the local node accordingly, for example, tracing, or switching for holding, and transmits the node synchronization information to the downstream node.

FIGS. 1A and 1B show a functional structure of a clock of an SDH device compliant with the International Telecommunication Union-Telecommunication Standardization Sector (ITU-T) G.783 recommendations. In FIGS. 1A and 1B, T1 is the input interface of the Level-N Synchronous Transfer Module (STM-N), and receives signals from the STM-N line; T2 is the input interface of the Plesiochronous Digital Hierarchy (PDH), and receives signals from a PDH tributary; T3 is an external synchronization input interface, and receives external timing input reference signals; Synchronous Equipment Timing Generator (SETG) is an SDH Equipment Clock (SEC); T4 is an external synchronization output interface, and its timing output may be exported by the STM-N line directly or from the SETG; and T0 is an internal timing interface.

In FIGS. 1A and 1B, the orde of priority for selecting the timing reference clock signals (from high to low) by a selector is as follows:
1. Manual forced command, for example, forced holding, or forced switching;
2. Timing signal failure, for example, LOS, AIS or OOF (LOF);
3. SSM quality level; and
4. Preset priority.

The traditional transmission topology is simple, namely, is mainly a ring or a chain. With the development of transport networks, the transport network topology evolves to a mesh network topology. As a result, the traditional SSM protocol is hardly adaptive to the development of transport networks due to functional limitation.

In a network, the corresponding reference source priority table needs to be configured for all network elements according to the clock tracing conditions. Therefore, the clock tracing needs to be well planned through manual configuration at the beginning of network construction; that is, the corresponding source priority list needs to be configured manually to prevent clock interlocking and prevent a high-stratum clock from tracing a low-stratum clock anyway. Meanwhile, two reference sources are configured for each network element in the network for the purpose of mutual protection.

However, the prior art is vulnerable to clock tracing loops and unable to prevent a high-stratum clock from tracing a low-stratum clock, and tends to make a network element unable to trace the source.

BRIEF SUMMARY

A method, apparatus, and network element for clock tracing are provided in embodiments consistent with the present disclosure for avoiding clock tracing errors that occur in a complex network.

A clock tracing method is provided in an embodiment of the present disclosure. The method includes: determining a shortest path to each source network element according to stored network topology information and source network element information, and selecting a best source network element among all source network elements; and determining a shortest path to the best source network element according to the shortest path, using the shortest path to the best source network element as a clock tracing path if the shortest path to the best source network element is different from an old clock tracing path and a traceable message is received, and using the clock tracing path for tracing clocks.

A clock tracing method is provided in an embodiment of the present disclosure. The method includes: selecting a best source network element among all source network elements, and determining a shortest path to the best source network element according to stored network topology information and source network element information; and using the shortest path to the best source network element as a clock tracing path if the shortest path to the best source network element is different from an old clock tracing path and a traceable message is received, and using the clock tracing path for tracing clocks.

A clock tracing apparatus is provided in an embodiment of the present disclosure. The apparatus includes: a path computing module, adapted to compute a shortest path to each source network element according to stored network topology information and source network element information; a selecting module, adapted to select a best source network element among all source network elements; a path information judging module, adapted to: determine a shortest path to the best source network element according to the path information computed by the path computing module, judge whether the shortest path is different from an old clock tracing path, and output a judgment result if the two paths are different; a message judging module, adapted to: judge whether a traceable message is received according to the judgment result indicating that the two paths are different, and output a judgment result if a traceable message is received; and a first processing module, adapted to: use the shortest path to the best source network element as a clock tracing path according to the judgment result indicating that a traceable message is received, and trace clocks through the clock tracing path.

Another clock tracing apparatus is provided in an embodiment of the present disclosure. The apparatus includes: a selecting module, adapted to select a best source network element among all source network elements; a path computing module, adapted to compute a shortest path to the best source network element according to stored network topology information and source network element information; a path information judging module, adapted to: judge whether the shortest path is different from an old clock tracing path according to the shortest path computed by the path computing module, and output a judgment result if the two paths are different; a message judging module, adapted to: judge whether a traceable message is received according to the judgment result indicating that the two paths are different, and output a judgment result if a traceable message is received; and a first processing module, adapted to: use the shortest path to the best source network element as a clock tracing path according to the judgment result indicating that a traceable message is received, and trace clocks through the clock tracing path.

A clock tracing method is provided in an embodiment of the present disclosure. The method includes: determining a shortest path to each source network element according to stored network topology information and source network element information, and determining a best source network element among all source network elements; determining a shortest path to the best source network element according to the shortest path, using the shortest path to the best source network element as a clock tracing path if the shortest path to the best source network element is different from an old clock tracing path and a traceable message is carried in a received S1 overhead byte, and using the clock tracing path for tracing clocks; and using the old clock tracing path for tracing clocks if the shortest path to the best source network element is the same as the old clock tracing path or no traceable message is carried in the received S1 overhead byte.

A clock tracing method is provided in an embodiment of the present disclosure. The method includes: selecting a best source network element among all source network elements, and determining a shortest path to the best source network element according to stored network topology information and source network element information; using the shortest path to the best source network element as a clock tracing path if the shortest path to the best source network element is different from an old clock tracing path and a traceable message is carried in a received S1 overhead byte, and using the clock tracing path for tracing clocks; and using the old clock tracing path for tracing clocks if the shortest path to the best source network element is the same as the old clock tracing path or no traceable message is carried in the received S1 overhead byte.

A network element is provided in an embodiment of the present disclosure. The network element includes: a path computing module, adapted to compute a shortest path to each source network element according to stored network topology information and source network element information; a selecting module, adapted to select a best source network element among all source network elements; a path information judging module, adapted to: determine a shortest path to the best source network element according to the path information computed by the path computing module, judge whether the shortest path is different from an old clock tracing path, and output a judgment result; a message judging module, adapted to: judge whether a traceable message is carried in a received S1 overhead byte according to the judgment result which is output by the path information judging module and indicates that the two paths are different, and output a judgment result; a first processing module, adapted to: use the shortest path to the best source network element as a clock tracing path according to the judgment result that is output by the message judging module and indicates that a traceable message is received, and trace clocks through the clock tracing path; and a second processing module, adapted to use the old clock tracing path to trace clocks according to the judgment result that is output by the path information judging module and indicates that the two paths are the same or according to the judgment result that is output by the message judging module and indicates that no traceable message is received.

A computer-readable storage medium is provided in an embodiment to store the software for implementing the clock tracing method in a network. When being executed, the software performs the following steps of the method: determining a shortest path to each source network element according to stored network topology information and source network element information, and selecting a best source network element among all source network elements; determining a shortest path to the best source network element according to the shortest path, using the shortest path to the best source network element as a clock tracing path if the shortest path to the best source network element is different from an old clock tracing path and a traceable message is received, and using the clock tracing path for tracing clocks; and using the old clock tracing path for tracing clocks if the shortest path to the best source network element is the same as the old clock tracing path or no traceable message is received.

A computer storage medium is provided in an embodiment of the present disclosure to store the software for implementing the clock tracing method in a network. When being executed, the software performs the following steps of the method: selecting a best source network element among all source network elements, and determining a shortest path to the best source network element according to stored network topology information and source network element information; and using the shortest path to the best source network element as a clock tracing path if the shortest path to the best source network element is different from an old clock tracing path and a traceable message is received, and using the clock tracing path for tracing clocks; and using the old clock tracing path for tracing clocks if the shortest path to the best source network element is the same as the old clock tracing path or no traceable message is received.

BRIEF DESCRIPTION OF THE DRAWINGS

The accompanying drawings, which are incorporated in and constitute a part of this specification, illustrate some embodiments and together with the description, serve to explain the principles of the embodiments disclosed herein.

DETAILED DESCRIPTION OF THE EMBODIMENTS

A clock tracing method provided in an embodiment of the present disclosure includes: computing a shortest path from each distributed network element to each source network element, determining a best source network element among all source network elements, and comparing the shortest path to the best source network element with an old clock tracing path; if the shortest path is different from the old clock tracing path, judging whether a traceable message is received; and, if a traceable message is received, tracing the source of the highest quality according to the shortest path to the best source network element. According to the technical solution under the present disclosure, automatic clock tracing is performed quickly after the tracing relation between the upstream network element and the downstream network element of the clock tracing tree is determined through the traceable message. Embodiments as disclosed herein may enable each distributed network element to always trace the source of the highest quality, and avoids clock tracing errors. A clock tracing apparatus and network element corresponding to the clock tracing method are provided in an embodiment of the present disclosure, as detailed below.

Figure 1A:
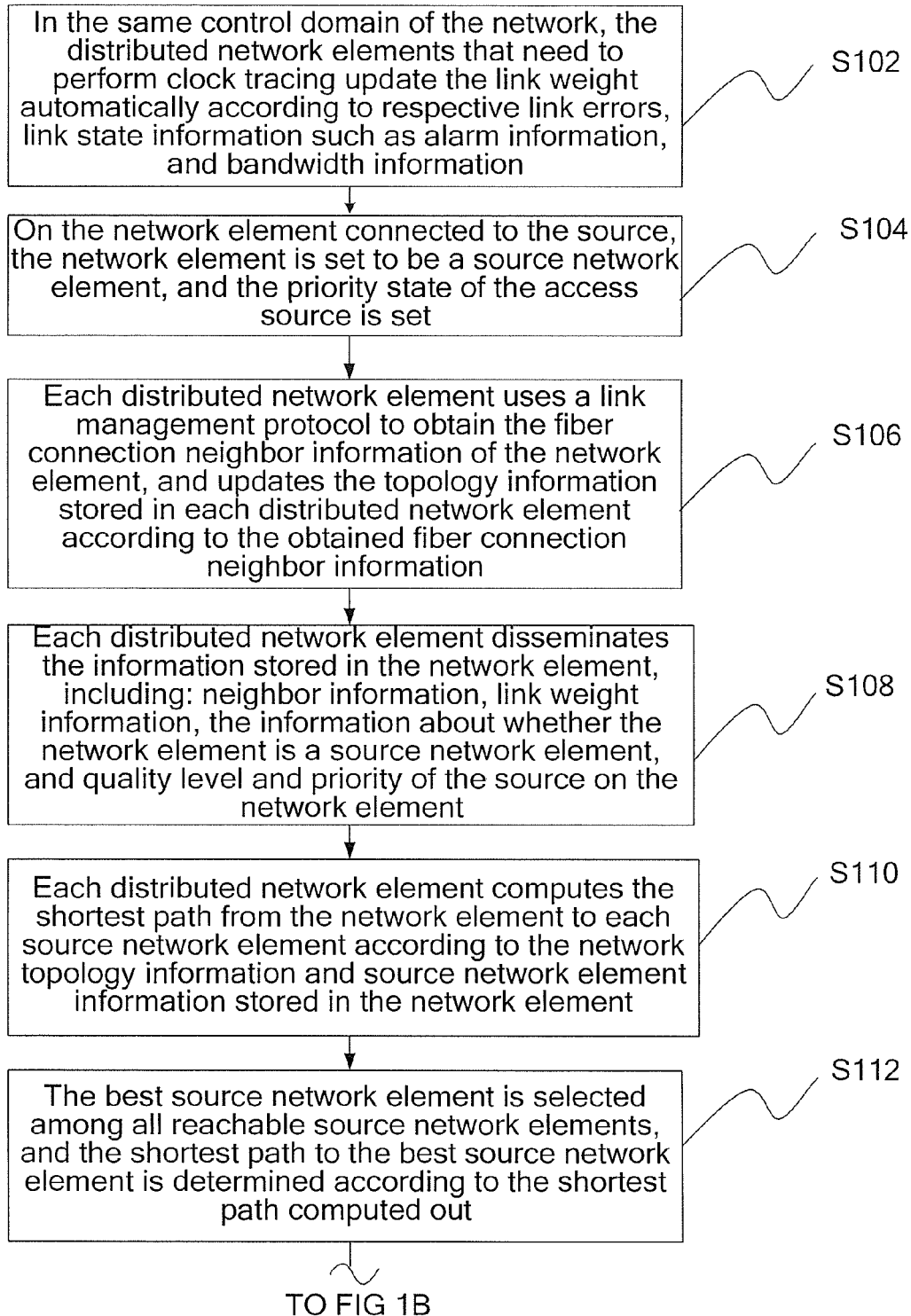
FIGS. 1A and 1B show a clock tracing method according to an embodiment of the present disclosure.
Figure 1B:
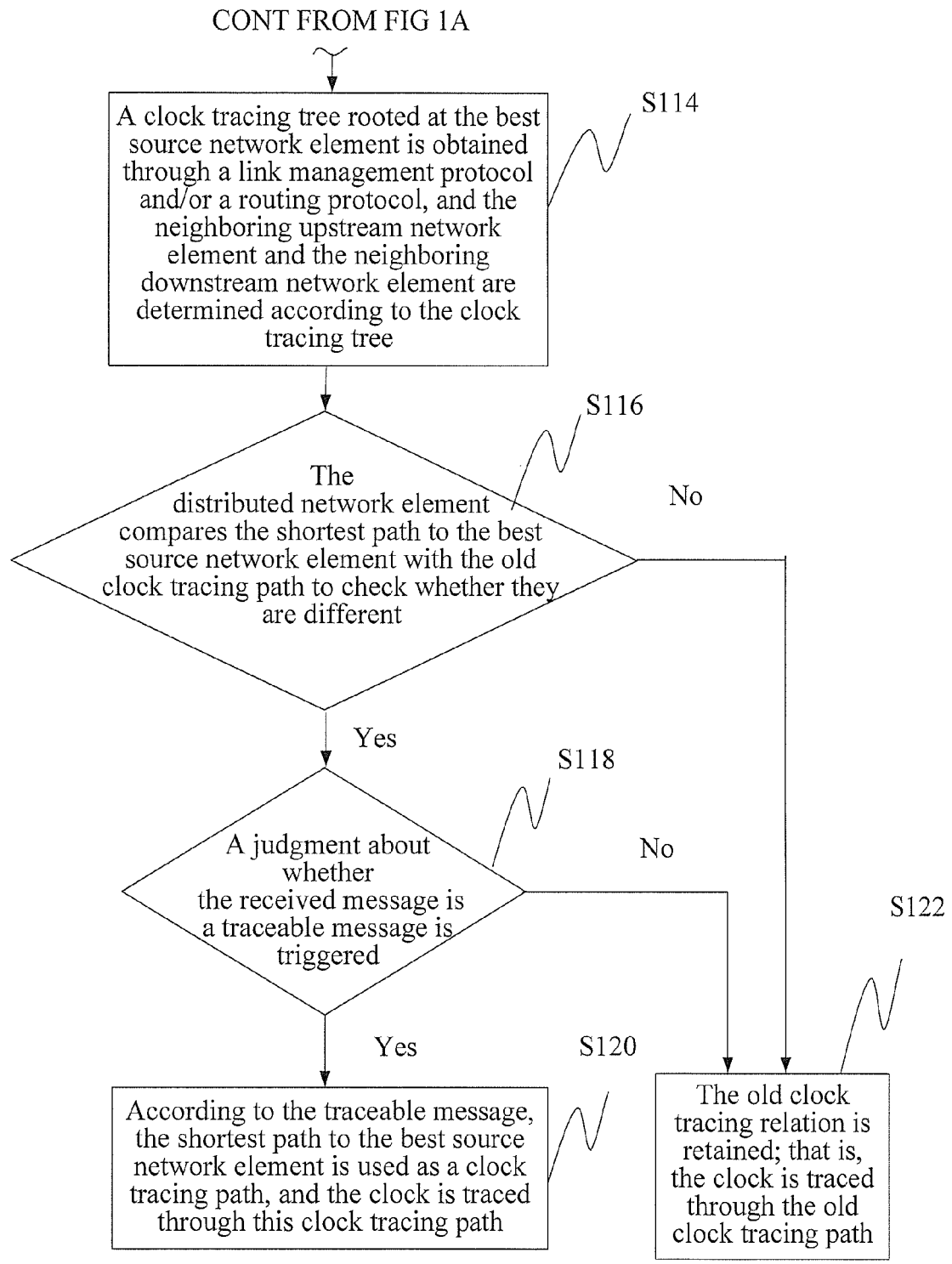

The topology of transport networks has evolved to a mesh network topology. In a mesh network, because the network topology is not a simple ring or chain, the network topology is vulnerable to clock tracing loops, and a high-stratum clock tends to trace a low-stratum clock. Most network elements have only two reference sources which protect each other. When multiple network elements or links fail, multi-point failure is inevitable, and the network element may be unable to trace the source. Besides, manual configuration generally leads to a long transmission path of the clock, and affects the effect of clock tracing. In the clock tracing process, therefore, the clock tracing relation needs to be refreshed dynamically according to the network topology. FIGS. 1A and 1B show a clock tracing method according to an embodiment of the present disclosure. The method includes the following steps:

S102: In the same control domain of the network, the distributed network elements that need to perform clock tracing update the link weight automatically according to respective link errors, link state information such as alarm information, and bandwidth information.

The link weight describes the link quality for clock tracing. The clock tracing path prefers the link of higher quality. In the default state, the link weight is manually configurable.

S104: On the network element connected to the source, the network element is set to be a source network element, and the priority state of the access source is set.

After the source network element is set, the clock signal processing unit of the source network element monitors the source and refreshes the quality level of the access source automatically. The quality level of the source is also manually configurable. Besides, a timing period of computing the clock tracing path may be set on each network element. Upon expiry of the timing period, the network element is triggered to compute the clock tracing path.

S106: Each distributed network element uses a link management protocol to obtain the fiber connection neighbor information of the network element, and updates the topology information stored in each distributed network element according to the obtained fiber connection neighbor information.

Link management protocols include: the Link Management Protocol (LMP), the Link Layer Discovery Protocol (LLDP), and so on. This step aims to enable each distributed network element to obtain the latest neighbor information.

S108: Each distributed network element disseminates the information stored in the network element, including: neighbor information, link weight information, the information about whether the network element is a source network element, and quality level and priority of the source on the network element.

The information is disseminated through an extended link state routing protocol such as the extended Open Shortest Path First-Traffic Engineering (OSPF-TE) protocol. Therefore, each distributed network element obtains the topology information of the whole network, link weight information, source network element information, source quality level, and source priority information. The source network element information recorded in the network element is about whether the network element is a source network element.

Meanwhile, the neighbor information and the link weight information of each distributed network element, the information about whether the network element is a source network element, and quality level and priority of the source on the network element may also change. The change of such information is also disseminated through an extended link state routing protocol such as the extended OSPF-TE.

The dissemination of the information in the network enables each network element that needs to perform clock tracing to select the clock tracing path and the traced source flexibly according to the information.

After the foregoing configuration is completed, when the distributed network element that needs to perform clock tracing decides to start or resume clock tracing, the distributed network element automatically computes and obtains the shortest path to the best source network element, namely, the best clock tracing path.

Generally, the network element that needs to perform clock tracing decides it necessary to start or resume computing the clock tracing path upon change of the network topology, link weight, source network element information, or any combination thereof, or upon expiry of the preset timing period.

The process of determining the best clock tracing path is as follows:

S110: Each distributed network element computes the shortest path from the network element to each source network element according to the network topology information and source network element information stored in the network element.

Each distributed network element that needs to perform clock tracing computes the shortest path from the network element to each source network element by means of an anti-loop shortest path algorithm according to the source network element information obtained by the network element and the network topology information. Shortest path algorithms include the Shortest Path First (SPF) and minimum spanning tree algorithm.

If the shortest path from the source node to the destination node is computed through an SPF algorithm, two sets (path tree set and potential next-hop set) involved by the SPF algorithm are initialized to two empty sets, and then the following operations are performed:

a. The source node is put into the potential next-hop set.

b. Node A is selected from the potential next-hop set and put into the path tree, where the path weight from the source node to node A is the shortest. If the potential next-hop set is already empty, the computation fails, and the process is ended; or, if the selected node is a destination node, the computation succeeds, and the shortest path is found and stored into the path tree set, and the process is ended; in other cases, the process proceeds to step c.

c. All nodes linked to node A are checked to see whether the node can be put into the potential next-hop set. If the node is neither in the path tree nor in the potential next-hop set, the node is put into the potential next-hop set; or if the node is already in the path tree set, no operation needs to be performed for the node; or if the node is already in the potential next-hop set, a comparison is made between the path weight of the new path to the node and the path weight of the old path to the node in the potential next-hop set, and the old path is deleted and the new path is stored into the potential next-hop set if the path weight of the new path is less than that of the old path; no operation is required if the path weight of the old path is less than that of the new path; after all nodes linked to node A are checked, the process returns to step b.

With the anti-loop shortest path algorithm, the source traced by the distributed network element is selected among the traceable sources obtained by the network element, thus avoiding clock tracing loops.

It should be noted that, the foregoing step of obtaining and disseminating the link weight information is not mandatory. Without link weight information, the network element can compute the shortest path to the source network element with fewest hops simply according to the network topology information and the source network element information stored in the network element.

If it is impossible to compute the shortest path to any source, the clock of the network element is set to the free-run mode.

S112: The best source network element is selected among all reachable source network elements, and the shortest path to the best source network element is determined according to the shortest path computed out.

The source network element of the best source quality is determined according to the quality level of the source, the corresponding clock priority, and the source network element identifier. First, a better source network element is selected according to the quality levels of different sources; if the source quality level is the same, the access source network element of the highest priority is selected; if the source quality level is the same and the priority is also the same, the best source network element is determined and selected according to the source network element identifier, for example, the source network element with the largest identifier, or the source network element with the smallest identifier.

The best source network element is determined among the network elements that need to perform clock tracing, thus further ensuring the quality of clock tracing implemented according to the clock tracing solution under the present disclosure.

S114: A clock tracing tree rooted at the best source network element is obtained through a link management protocol and/or a routing protocol, and the neighboring upstream network element and the neighboring downstream network element are determined according to the clock tracing tree.

S116: The distributed network element compares the newly computed shortest path to the best source network element with the old clock tracing path. If the newly computed shortest path is different from the old clock tracing path, the process proceeds to step S118; or, if the newly computed shortest path is the same as the old clock tracing path, the process proceeds to step S122.

S118: A judgment about whether a traceable message is received is triggered. If a traceable message is received, the process proceeds to step S120; otherwise, the process proceeds to step S122.

In this application, a "traceable message" means a message sent by a network element in a clock tracing tree to the neighboring downstream network element after completion of the clock tracing. Therefore, after obtaining the clock tracing tree and determining the upstream and downstream clock tracing relation, the neighboring downstream network element decides to use the computed clock tracing path to perform clock tracing according to the traceable message.

Specifically, after the clock tracing tree rooted at the best source network element is determined, if the best source network element (such as node A) traces the source according to the clock tracing tree information, node A sends a traceable message to the neighboring downstream network element (such as node B) along the clock tracing tree. Likewise, after receiving the traceable message from the neighboring upstream node A, node B sends a traceable message to the neighboring downstream network element along the clock tracing tree upon completion of clock tracing.

Evidently, the precondition for receiving the traceable message is: After the clock tracing tree rooted at the best source network element is determined, the neighboring upstream network element needs to finish clock tracing before it can send a traceable message according to the clock tracing tree.

It should be noted that, a traceable message is generally carried in an overhead byte or an Ethernet packet; overhead bytes include an S1 overhead byte and a Data Communication Channel (DCC) overhead byte; and Ethernet packets include an Operations, Administration and Maintenance (OAM) packet. The clock tracing method is described in detail below, taking an S1 overhead byte as an example. Therefore, the corresponding step is: A distributed network element judges whether the received overhead byte or Ethernet packet carries a traceable message.

S120: According to the traceable message, the shortest path to the best source network element is used as a clock tracing path, and the clock is traced through this clock tracing path.

After receiving the traceable message from the neighboring upstream network element, the distributed network element changes the clock tracing relation in the clock signal processing unit of the network element, namely, uses the computed shortest path to the best source network element as the clock tracing path of the network element.

Upon completion of clock tracing, the distributed network element sends a traceable message to the neighboring downstream network element along the clock tracing tree.

S122: The old clock tracing relation is retained; that is, the clock is traced through the old clock tracing path.

Consistent with some embodiments as disclosed in the present disclosure, when the shortest path to the best source network element is different from the old clock tracing path, automatic clock tracing is performed quickly after the tracing relation of the upstream and downstream network elements of the clock tracing tree is determined according to the traceable message, thus avoiding service transmission failures caused by clock tracing errors. The clock tracing is performed by using the shortest path, and multiple sources of the best quality are selected for tracing clocks, thus preventing multi-point failure and ensuring high-quality clock transmission.

Figure 2A:
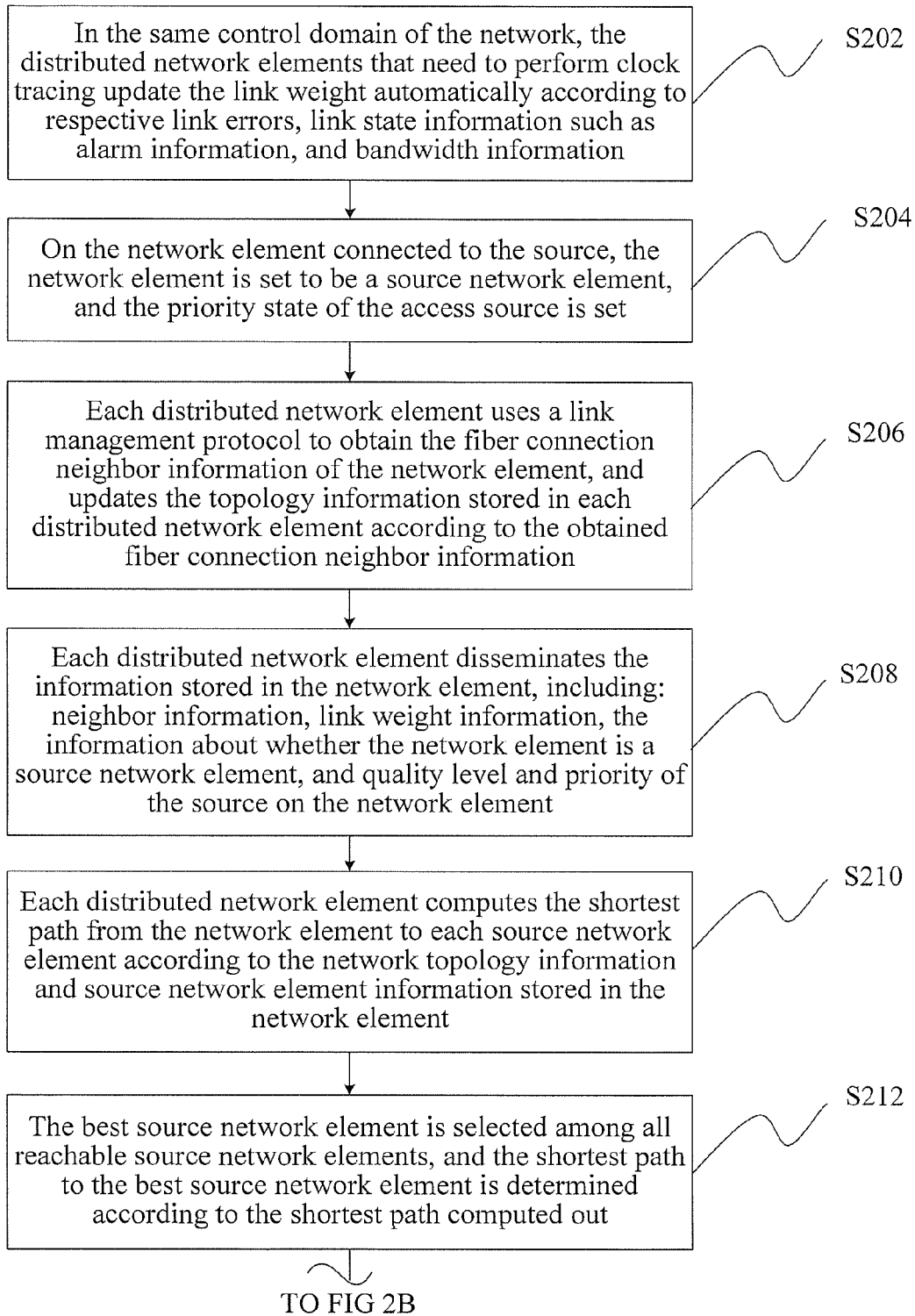
FIGS. 2A and 2B show a clock tracing method according to another embodiment of the present disclosure.
Figure 2B:
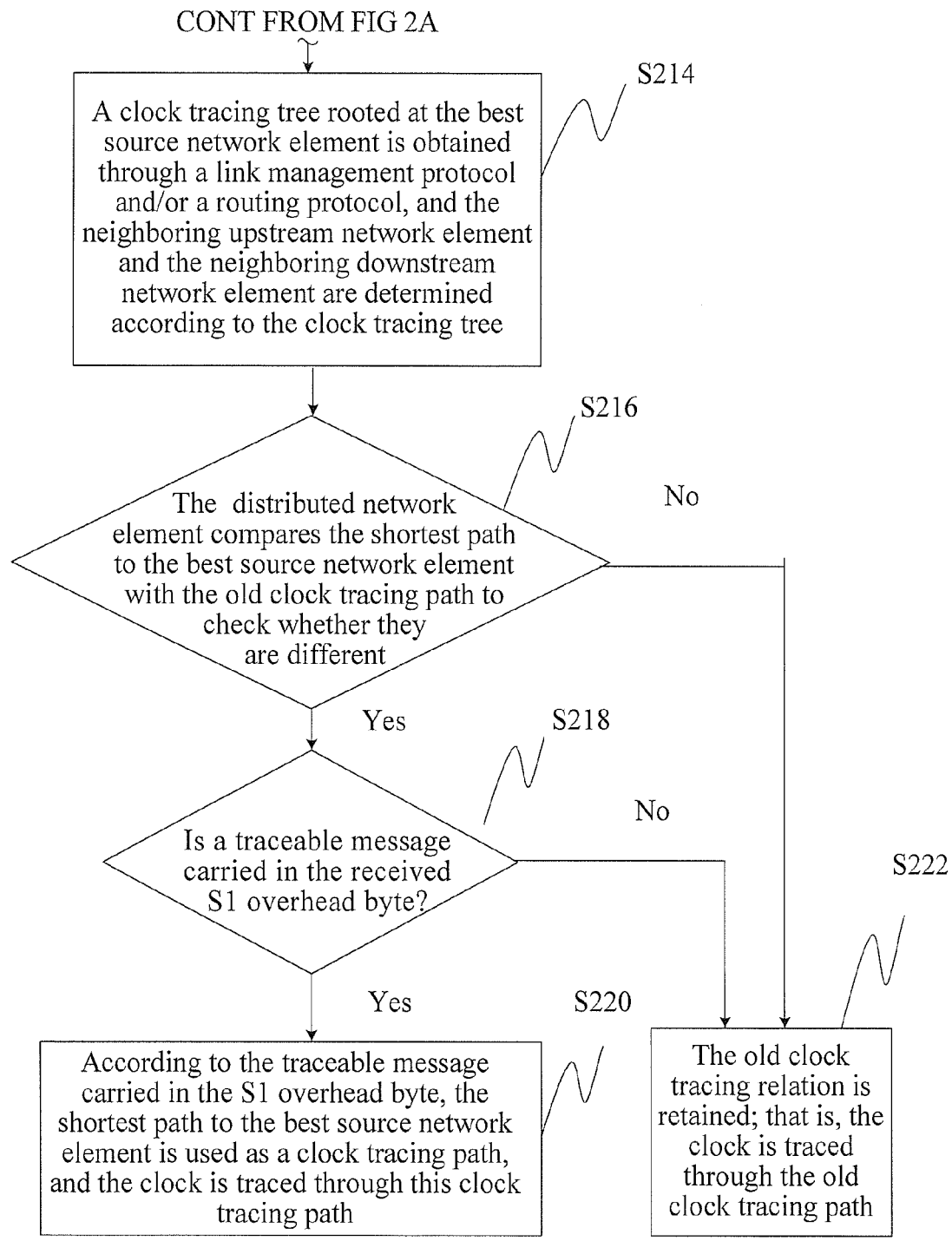

As shown in FIGS. 2A and 2B, another clock tracing method is provided in an embodiment of the present disclosure, taking the S1 overhead byte as an example. The method includes the following steps:

Steps S202-S216 are similar to S102-S116 and are not described further.

S218: A judgment about whether a traceable message is carried in the received S1 overhead byte is triggered. If a traceable message is carried, the process proceeds to step S220; otherwise, the process proceeds to step S222.

An S1 overhead byte is composed of eight bits. The highest four bits of the S1 overhead byte are set to all 1s, namely, 1111xxxx (for example, 11110000). In the following scenarios, the received S1 overhead byte is determined as carrying a traceable message:

a. If the S1 overhead byte received by the distributed network element is sent by a neighboring upstream network element in the clock tracing tree, and uses all 1s as the highest four bits, it indicates that the S1 overhead byte carries a traceable message.

b. If the S1 overhead byte received by the distributed network element is sent by a neighboring upstream network element in the new clock tracing tree, and uses bits other than all 1s as the highest four bits, it indicates that the S1 overhead byte carries no traceable message.

S220: According to the traceable message carried in the S1 overhead byte, the shortest path to the best source network element is used as a clock tracing path, and the clock is traced through this clock tracing path.

S222: The old clock tracing relation is retained. That is, the clock is traced through the old clock tracing path.

According to the two method embodiments described above, the source network element issues the clock quality information in the network again. Therefore, the distributed network element in the network can determine the best source network element first in all the source network elements. Afterward, the distributed network element determines the shortest path to the best source network element according to stored network topology information and source network element information. Finally, the distributed network element compares the shortest path to the best source network element with the old clock tracing path. If the two paths are different, the distributed network element judges whether a traceable message is received (taking the S1 overhead byte as an example, judges whether the S1 overhead byte carries a traceable message). If a traceable message is received, the distributed network element uses the shortest path to the best source network element as a clock tracing path, and uses this clock tracing path to trace clocks. If no traceable message is received, the distributed network element still uses the old clock tracing path to trace clocks.

It is understandable to those skilled in the art that all or part of the steps in the foregoing embodiments may be performed through hardware instructed by a program. The program may be stored in a computer-readable storage medium such as a Read-Only Memory/Random Access Memory (ROM/RAM), a magnetic disk, and a compact disk. When being executed, the program performs the steps of the foregoing methods.

Figure 3:
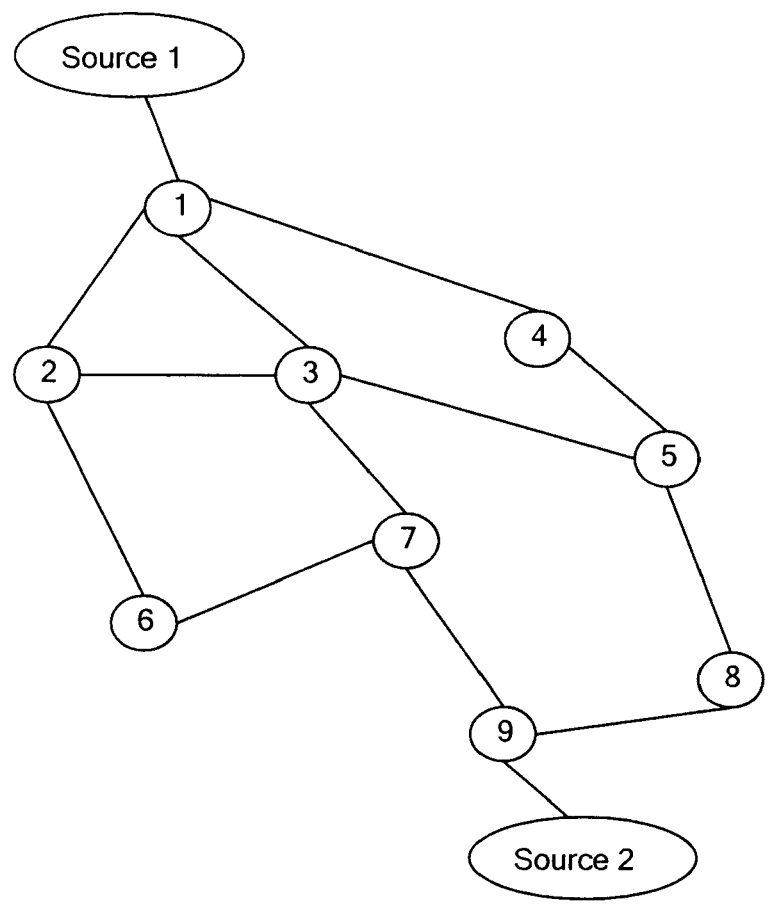
FIG. 3 shows a mesh network structure according to another embodiment of the present disclosure.

FIG. 3 shows a mesh network structure according to another embodiment of the present disclosure. Network elements 1-9 are distributed network elements; source 1 and source 2 are clock sources; network element 1 and network element 9 connected to the source are access source network elements; the clock tracing link weight is the same; source 1 and source 2 have the same quality level, but the priority of source 1 is higher than the priority of source 2.

Figure 4:
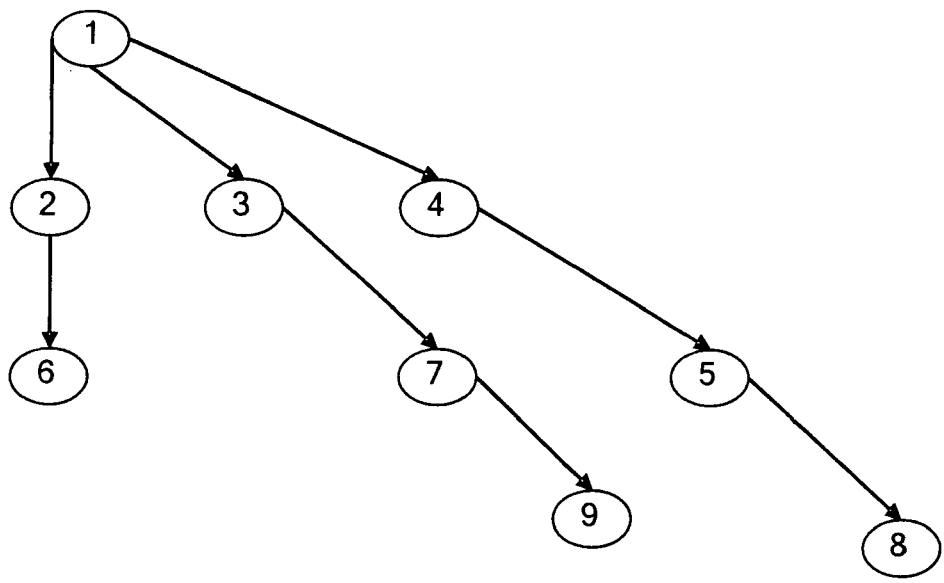
FIG. 4 shows an old clock tracing tree according to another embodiment of the present disclosure.

When the link between network element 3 and network element 7 fails, the distributed network elements 1-9 are triggered to re-compute the clock tracing path. FIG. 4 shows an old clock tracing tree according to another embodiment of the present disclosure. It illustrates the old clock tracing relation between the distributed network elements in the network before the failure occurs. As shown in FIG. 4, the old clock tracing tree uses network element 1 as a root, and has three branches: 1→2→6, 1→3→7→9, and 1→4→5→8.

Figure 5:
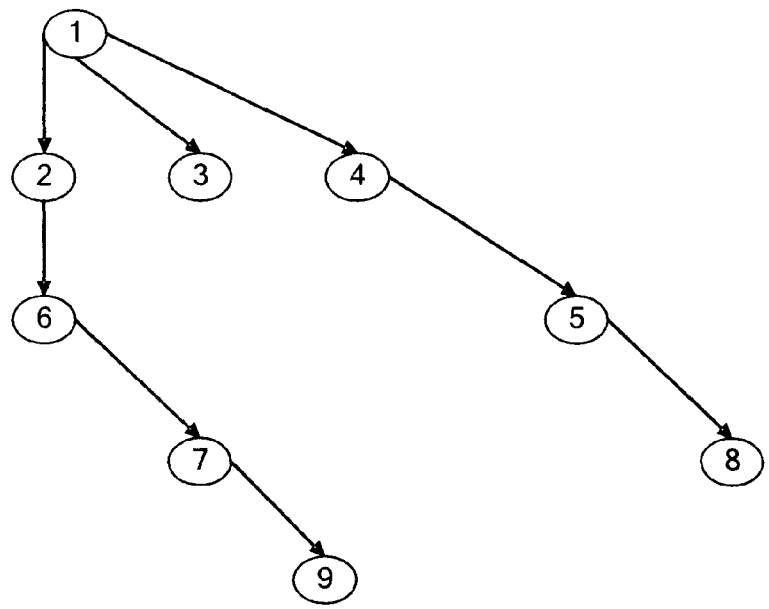
FIG. 5 shows a new clock tracing tree according to another embodiment of the present disclosure.

First, each distributed network element computes the shortest path to network element 1 and network element 9. Because the priority of source 1 is higher than the priority of source 2, network element 1 connected to source 1 is selected as the best source network element, and the shortest path to network element 1 is determined. Through a link management protocol and/or a routing protocol, each distributed network element obtains a new clock tracing tree rooted at network element 1, and determines the neighboring upstream network element and the neighboring downstream network element. FIG. 5 shows a new clock tracing tree according to another embodiment of the present disclosure. Specifically, the new clock tracing tree uses network element 1 as a root, and has three branches: 1→2→6→7→9, 1→3, and 1→4→5→8. Taking network element 7 as an example, its neighboring upstream network element is determined as network element 6 and its neighboring downstream network element is determined as network element 9 according to the new clock tracing tree. Afterward, network element 7 compares the computed new clock tracing path with the old clock tracing path. Evidently, the two paths are different. In this case, network element 7 judges whether it receives a traceable message from network element 6. Network element 6 re-computes the new clock tracing tree according to a link failure message, and determines network element 7 as its neighboring downstream network element. After completing the clock tracing for network element 2, network element 6 sends a traceable message to network element 7 (for example, by adding the traceable message to an S1 overhead byte whose highest four bits are all 1s). After receiving the traceable message from the new neighboring upstream network element 6 (the old neighboring upstream network element is network element 3), network element 7 performs clock tracing for network element 6.

It should be noted that, when the network element in the new clock tracing tree has not finished clock tracing, the network element may send an S1 overhead byte to its neighboring downstream network element, but the S1 overhead byte carries no traceable message. In the foregoing example, after network element 7 detects the link failure before tracing network element 6 successfully, network element 7 sends an S1 overhead byte to the neighboring network element 9, and the highest four bits of this S1 overhead byte are not all 1s.

In the method in this embodiment, if the source network element and the distributed network element that needs to perform clock tracing are in different control domains of the hierarchical network, the distributed element in each control domain may be set as a speaker network element that traces this control domain. The speaker network element is a technical term in the hierarchical routing protocol and means that information is exchanged only between this control domain and another control domain; that is, a non-speaker network element in the control domain is not allowed to exchange information with any network element in other control domains directly.

In this embodiment, SSM protocol processing is also allowed on each distributed network element, and the SSM quality output is the same as the quality output of the traditional SSM protocol. That is, to keep compatibility with the original networks, this embodiment still supports SSM protocol processing and outputs the information identical with the output of the original protocol, but does not use the SSM protocol to trace clocks.

Figure 6:
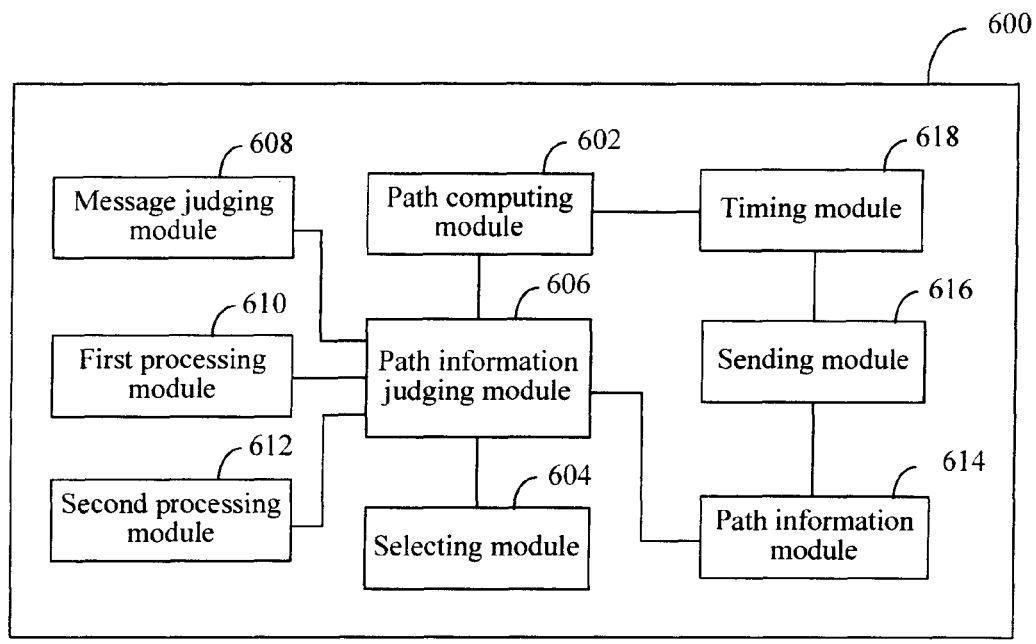
FIG. 6 shows a clock tracing apparatus according to another embodiment of the present disclosure.

As shown in FIG. 6, a clock tracing apparatus is provided in an embodiment of the present disclosure. The apparatus 600 includes: a path computing module 602, a selecting module 604, a path information judging module 606, a message judging module 608, a first processing module 610, and a second processing module 612, as detailed below:

The path computing module 602 is adapted to compute the shortest path to each source network element according to stored network topology information and source network element information.

The selecting module 604 is adapted to select the best source network element among all source network elements.

The path information judging module 606 is adapted to: determine the shortest path to the best source network element according to the path information computed out by the path computing module 602, judge whether the shortest path is different from the old clock tracing path, and output a first judgment result if the two paths are different, or output a second judgment result if the two paths are the same.

The first judgment result indicates that the shortest path to the best source network element is different from the old path, and the second judgment result indicates that the shortest path to the best source network element is the same as the old path.

The message judging module 608 is adapted to: judge whether a traceable message is received according to the first judging result, and output a third judgment result if a traceable message is received, or output a fourth judgment result if no traceable message is received.

The third judgment result indicates that a traceable message is received, and the fourth judgment result indicates that no traceable message is received.

It should be noted that, a traceable message is generally carried in an overhead byte or an Ethernet packet; overhead bytes include an S1 overhead byte and a DCC overhead byte; Ethernet packets include an OAM packet.

The first processing module 610 is adapted to: use the shortest path to the best source network element as a clock tracing path according to the third judgment result, and trace clocks through the clock tracing path.

The second processing module 612 is adapted to trace clocks through the old clock tracing path according to the second judgment result or the fourth judgment result.

The apparatus 600 further includes a path information module 614, which is adapted to: use a link management protocol and/or a routing protocol to obtain a clock tracing tree rooted at the best source network element, and store the information about the clock tracing tree, and store information about the old clock tracing path.

The apparatus 600 further includes a sending module 616, which is adapted to send a traceable message according to the information about the clock tracing tree.

The apparatus 600 further includes a timing module 618, which is adapted to: set a first timing period and a second timing period, where the first timing period may be the same as or different from the second timing period. The path computing module 602 computes the shortest path automatically according to the first timing period, and the sending module 616 sends a traceable message according to the second timing period.

The process of clock tracing based on the technical solution in this apparatus embodiment is similar to that described in the foregoing method embodiments, and is not described further. The modules in the apparatus embodiment may be combined flexibly. Those skilled in the art may make various modifications and variations to the present disclosure without departing from the spirit and scope of the disclosure. Through the apparatus provided in this embodiment, after the tracing relation of the upstream and downstream network elements in the clock tracing tree is determined according to the traceable message, automatic clock tracing is performed quickly, thus avoiding service transmission failures caused by clock looping or clock interlocking. The clock tracing is performed by using the shortest path, and multiple sources of the best quality are selected for tracing clocks, thus preventing multi-point failure and ensuring high-quality clock transmission.

Figure 7:
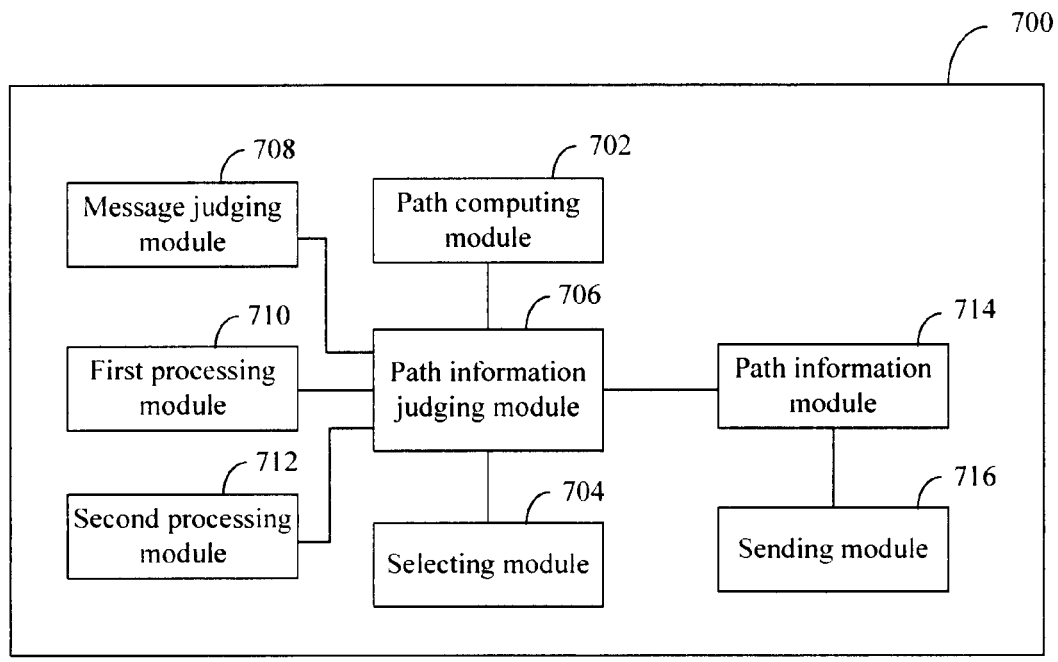
FIG. 7 shows a distributed network element according to another embodiment of the present disclosure.
Figure 8:
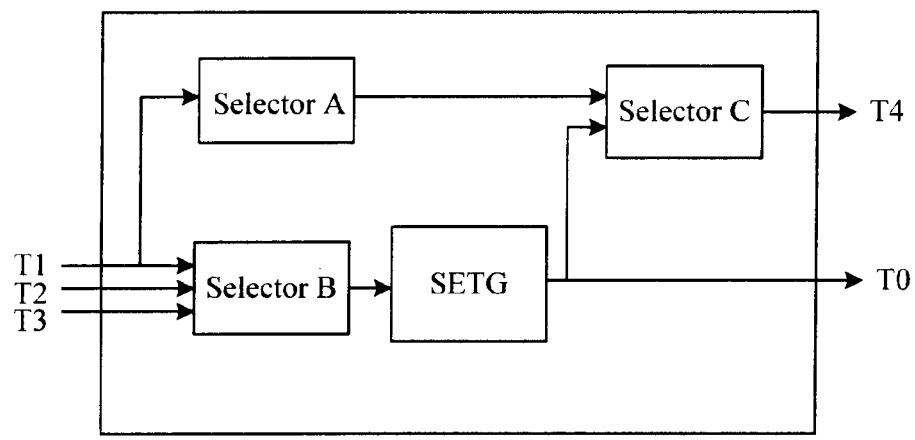
FIG. 8 shows a functional structure of a G.783 clock in the prior art.

As shown in FIG. 7, a distributed network element for clock tracing in the clock tracing apparatus is provided in an embodiment of the present disclosure, taking the S1 overhead byte as an example. The device 700 includes: a path computing module 702, a selecting module 704, a path information judging module 706, a message judging module 708, a first processing module 710, and a second processing module 712.

The path computing module 702 is adapted to compute the shortest path to each source network element according to stored network topology information and source network element information.

The selecting module 704 is adapted to select the best source network element among all source network elements.

The path information judging module 706 is adapted to: determine the shortest path to the best source network element according to the path information computed out by the path computing module 702, judge whether the shortest path is different from the old clock tracing path, and output a first judgment result if the two paths are different, or output a second judgment result if the two paths are the same.

The message judging module 708 is adapted to: judge whether a traceable message is carried in the received S1 overhead byte according to the first judging result, and output a third judgment result if a traceable message is carried, or output a fourth judgment result if no traceable message is carried.

The third judgment result indicates that a traceable message is carried in the received S1 overhead byte, and the fourth judgment result indicates that no traceable message is carried in the received S1 overhead byte. If it is determined that a traceable message is carried in the received S1 overhead byte, the highest four bits of the S1 overhead byte are generally set to all 1s.

The first processing module 710 is adapted to: use the shortest path to the best source network element as a clock tracing path according to the third judgment result, and trace clocks through the clock tracing path.

The second processing module 712 is adapted to trace clocks through the old clock tracing path according to the second judgment result or the fourth judgment result.

The device 700 further includes a path information module 714, which is adapted to: use a link management protocol and/or a routing protocol to obtain a clock tracing tree rooted at the best source network element, and store the information about the clock tracing tree, and store information about the old clock tracing path.

The device 700 further includes a sending module 716, which is adapted to send the S1 overhead byte that carries the traceable message according to the information about the clock tracing tree.

The process of clock tracing based according to some embodiments in this network element embodiment is similar to that described in the foregoing method embodiments, and is not described further. The modules in the network element embodiment may be combined flexibly. Those skilled in the art may make various modifications and variations to the present disclosure without departing from the spirit and scope of the disclosure.

Besides, because the source network element issues the clock quality information in the network again, the best source network element may be determined first, and then the shortest path to the best source network element is determined. For that purpose, the path computing module (602 or 702), the selecting module (604 or 704), and the path information judging module (606 or 706) in the clock tracing apparatus 600 or the distributed network element 700 may vary accordingly in the functional implementation. For other modules, the description about the network element functions above serves as a reference, and the modules are not described further.

The selecting module (604 or 704) is adapted to select the best source network element among all source network elements.

The path computing module (602 or 702) is adapted to compute the shortest path to the best source network element according to stored network topology information and source network element information.

The path information judging module (606 or 706) is adapted to: judge whether the shortest path is different from the old clock tracing path according to the shortest path computed out by the path computing module (602 or 702), and output a first judgment result if the two paths are different, or output a second judgment result if the two paths are the same.

Through the apparatus provided in this embodiment, after the tracing relation of the upstream and downstream network elements in the clock tracing tree is determined according to the traceable message carried in the S1 overhead byte, automatic clock tracing is performed quickly, thus avoiding service transmission failures caused by clock looping or clock interlocking. The clock tracing is performed by using the shortest path, and multiple sources of the best quality are selected for tracing clocks, thus preventing multi-point failure and ensuring high-quality clock transmission.

Although the disclosure has been described through several exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A clock tracing method in a network, comprising:
   determining a shortest path to a best clock source network element according to stored network topology information and clock source network element information, including:
   determining a shortest path to each clock source network element according to the stored network topology information and the clock source network element information, selecting the best clock source network element among all clock source network elements, and determining the shortest path to the best clock source network element; or
   selecting the best clock source network element among all clock source network elements, and determining the shortest path to the best clock source network element according to the stored network topology information and the clock source network element information;
   using the shortest path to the best source network element as a clock tracing path if the shortest path to the best source network element is different from an old clock tracing path and a traceable message is received,
   using the clock tracing path for tracing clocks;
   obtaining a clock tracing tree rooted at the best source network element through a link management protocol and/or a routing protocol;
   determining a neighboring upstream network element and a neighboring downstream network element according to the clock tracing tree; and
   sending, by the neighboring upstream network element, the traceable message to the neighboring downstream network element along the clock tracing tree if the neighboring upstream network element finishes clock tracing.

\* \* \* \* \*